April 11, 1961 J. A. HUBER 2,979,576
CORD REEL FOR ELECTRICAL APPLIANCES
Filed Dec. 20, 1957 2 Sheets-Sheet 2
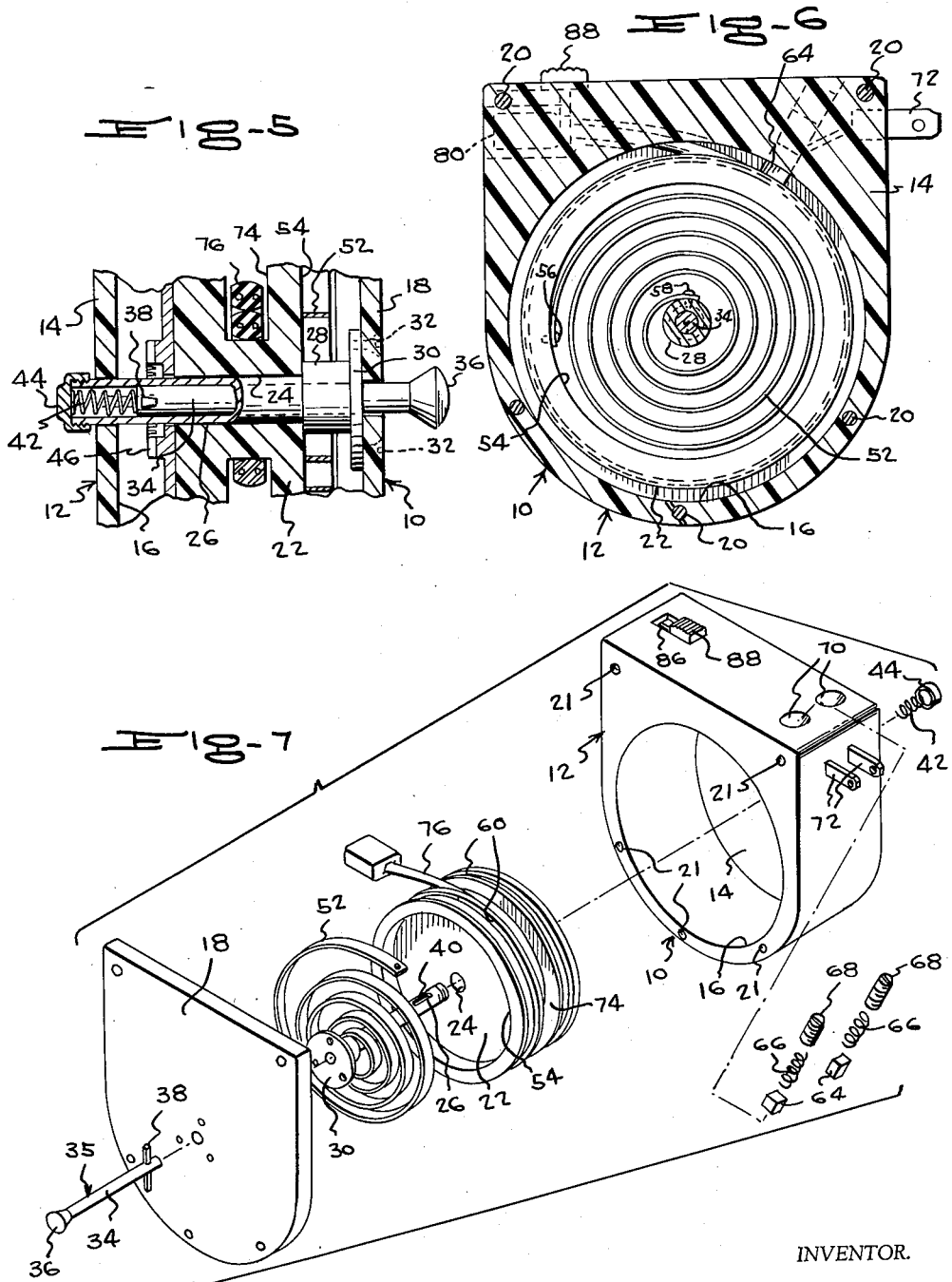
INVENTOR.
JOHN A. HUBER
BY
M?Morrow, Berman + Davidson
ATTORNEYS United States Patent Office 2,979,576
Patented Apr. 11, 1961

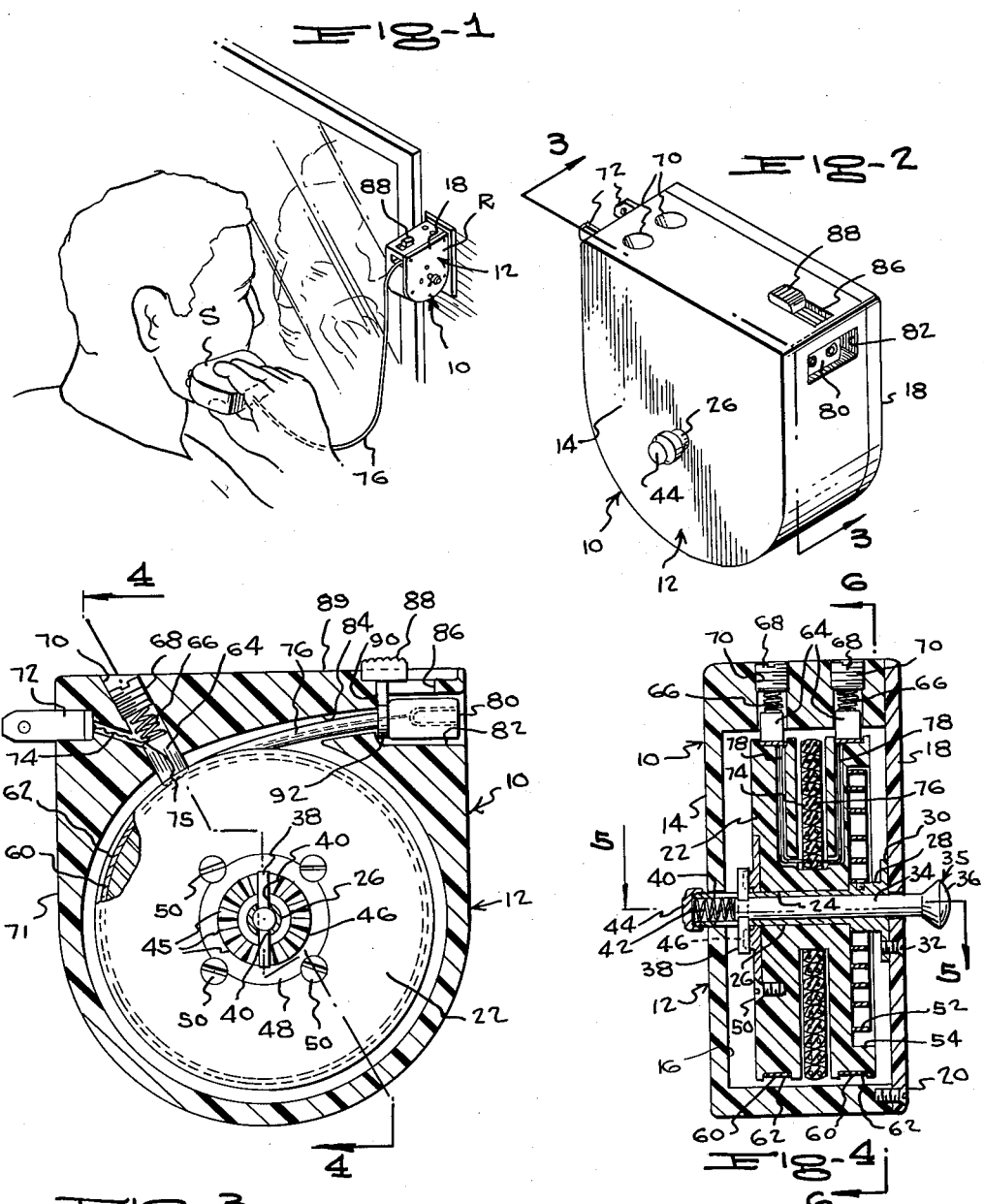

2,979,576

CORD REEL FOR ELECTRICAL APPLIANCES

John A. Huber, R.D. 2, Conestoga, Pa.

Filed Dec. 20, 1957, Ser. No. 704,198

1 Claim. (Cl. 191—12.4)

This invention relates to a reel on which is wound an electric cord extending from any of various electrical appliances, the reel of the invention being designed to retract said cord whenever it is not in use, while permitting the cord to be pulled out of the reel to any extent necessary during use of the particular electrical appliance.

Many electrical appliances are so designed that during their use, they must be continually moved about. Such would be the case, for example, with respect to electric irons, electric shavers, portable electric drills, etc. Even in the case of electrical appliances that are not moved about, the cord often gets in the way, becomes entangled, and in general represents a considerable inconvenience and annoyance. When one is about to use an electrical appliance, the cord must usually be unwound, stretched out, and plugged into a receptacle at one end. In many instances the cord must also be plugged into the appliance, at the other end of the cord. After the appliance has been used, the cord must then be disengaged and rewound, manually coiled or otherwise prepared once again for storage. During the actual use of the receptacle, the cord is moved about, often in paths which interfere with normal use of the electrical appliance.

In view of the above, it is proposed to provide a reel for an electric cord, so designed as to be attachable to a wall-mounted bracket or equivalent means, with the reel providing, at all times, an electrical connection so that the cord from the appliances may not be engaged in a receptacle each time the appliance is to be used. Further, the reel is designed to resiliently, yieldably oppose pulling of the cord from the housing of the reel, so that the reel will automatically retract the cord.

Another object is to so design the reel that a full electrical contact will be maintained at all times, between the source of electrical power and the appliance that is in use, even while the cord is being wound or unwound.

Another object of importance is to provide a device of the character stated which will include means facilitating extension of the outer end of the cord for a distance sufficient to permit the cord to be grasped and then extended as far as desired.

A further object of importance is to provide means that will releasably lock the drum of the reel in any position to which it is rotated, thus to cause the cord to remain extended if desired, said cord being of any selected length so far as the extended portion thereof is concerned.

Yet another object of importance is to provide a device of the character stated that will be compact, relatively inexpensive, substantially trouble-free in operation, and usable to advantage on a large variety of appliances such as electric toasters, mixers, electric irons, hobby shop appliances, light electric tools, vacuum cleaners, etc.

Other objects will appear from the following description, the claim appended thereto, and from the annexed drawing, in which like reference characters designate like parts throughout the several views, and wherein:

Figure 1 is a perspective view of a reel according to the present invention, as it appears when in use;

Figure 2 is an enlarged perspective view of the reel per se;

Figure 3 is a still further enlarged sectional view substantially on line 3—3 of Figure 2;

Figure 4 is a sectional view on the same scale as Figure 3, taken substantially on line 4—4 of Figure 3;

Figure 5 is a still further enlarged, detail sectional view substantially on line 5—5 of Figure 4;

Figure 6 is a sectional view on the same scale as Figure 3, taken substantially on line 6—6 of Figure 4; and Figure 7 is an exploded perspective view of the device.

Referring to the drawing in detail, designated generally at 10 is the cord reel constituting the present invention. The reel includes a casing generally designated at 12, formed of molded plastic or other electrically insulative material. Casing 12 has a flat top surface as shown in Figure 2, flat front and back faces, flat sides, and a rounded or approximately semi-circular bottom surface.

The casing includes a body portion 14 having a circular cavity 16 opening upon one side of the body portion, but normally closed by a closure plate 18 of the casing also formed of plastic material and secured removably to the body portion by a plurality of screws 20 extending through smooth-walled openings of the plates 18 and engaged in threaded recesses 21 (Figure 7) of the body portion 14.

A drum 22, also of plastic or other electrically insulative material, has a center opening or bore 24 extending transversely therethrough, and extending through said bore is a tubular spindle or axle 26, on which drum 22 rotates. Axle 26 at one end has an enlargement 28 formed with an outwardly directed, flat flange 30 provided with a circumferential series of openings receiving screws 32 that project through the cover plate 18, for the purpose of fixedly securing the axle to the cover plate. Enlargement 28 provides an abutment limiting the drum against axial displacement in one direction upon spindle 26.

To releasably hold the drum against rotation in selected positions to which it is turned upon the spindle, there is provided a detent means generally designated at 35 and including a straight, elongated stem or plunger 34 formed at one end with a button or head 36 disposed exteriorly of the casing. The shank of the stem extends within the tubular spindle, and said stem is axially shiftable within the spindle.

At its other end, stem 34 has a diametrically extending opening, in which is fixedly engaged a cross arm 38, the opposite end portions of said arm extending through and being slidable within diametrically opposed, longitudinally extending slots 40 formed in spindle 26.

Bearing against the stem 34 is a compression coil spring 42, held under compression between said stem (see Figure 4) and a cap 44 internally threaded to engage complementary threads on the adjacent end of the spindle 26. Spring 42, tending to expand, normally biases the stem 34 to the right in Figure 4, to engage the cross arm 38 in diametrically opposed, selected notches 45 (see Figure 3)

of an annular latching disc 46 formed over its full circumference with side-by-side, radially extending notches. Disc 46 is integrally formed upon a flat, circular plate 48 fixedly secured by a plurality of screws 50 in a shallow recess in the adjacent wall of the drum.

Designated at 52 is a flat, spiral spring, seated in a large diameter, shallow recess 54 formed in the face of the drum opposite that in which the disc 46 is secured. Spring 52 (see Figure 6) is anchored at its outer end by screw 56 to the side wall of the recess 54, while at its inner end it is similarly anchored by a screw 58 to the enlargement 28 of spindle or axle 26.

Therefore, when the drum rotates in one direction, the spring is placed under tension, that is, the spiral spring resiliently, yieldably opposes rotation of the drum in one direction and tends to rotate the drum in an opposite direction, for a purpose to be made presently apparent and in a manner to be discussed in full detail hereinafter.

In the periphery of the drum, there are formed shallow, circumferentially extending recesses 60, in which are fixedly engaged correspondingly continuous, electrically conductive, bands or contact strips 62. A pair of carbon brushes 64 are resiliently, yieldably biased into continuous engagement with the contact strips 62 by compression, coil springs 66 held under compression between the brushes and threaded plugs 68 of electrically insulative material engaged in threads formed in transversely spaced, parallel bores 70 (Figures 2 and 3) that are disposed radially of the axis of rotation of the drum 22.

Adjacent the bores 70 is the flat back wall 71 of the casing, and embedded in the back wall are rearwardly projecting, electrically conductive prongs 72 to the inner ends of which are fixedly secured leads 74 extending through narrow bores 75 and connected to the respective brushes 64. The prongs are adapted to be plugged into a conventional receptacle R (Figure 1), so as to provide an electrical current.

Between the bands or strips 62, the drum is formed with a deep, narrow cord recess 74, in which is coiled the electric cord 76. At its innermost convolution, cord 76 is fixedly secured to the core of the drum, with the leads of the cord being extended laterally outwardly in opposite directions, as clearly seen in Figure 4, into radially extending passages 78. Passages 78 extend to strips 62, with the leads being secured to the contact strips 62 at the outer ends of the passages 78, for the purpose of providing a permanent electrical connection between the strips 62 and the electrical cord.

At its outer end, the cord has a plug 80. In the illustrated example, the plug or cap 80 is of the type used on an electric shaver S (see Figure 1). Of course, the plug or cap can be of any desired type, and this would of course depend upon the particular type of electrical appliance to which power is to be supplied through the cord 76.

In the illustrated example, plug 80 is normally retracted into a forwardly opening plug recess 82, communicating with the drum cavity 16 through the medium of the bore 84, all as shown to particular advantage in Figure 3. Also communicating with recess 82 is a slot 86, and a button 88 is slidably mounted within the slot, projecting a short distance upwardly from the flat top surface 89 of the casing. Button 88 is integral or otherwise made rigid with a depending shank 90 which in turn is integral at its inner end with an eye or loop 92 loosely receiving cord 76 and bearing against the inner end of plug or electric cap 80.

The button 88 is for the purpose of advancing the plug 80 to a slight extent forwardly from the recess 82. This permits one to grasp the plug for the purpose of pulling it away from the casing to any extent desired.

Operation

In use, the device is plugged into a receptacle in the same manner as the electric plug or cap of an ordinary appliance cord. Then, assuming that the user desires to employ the device in connection with an electrical appliance such as a shaver S, the button 88 is shifted forwardly, that is, to the right in Figures 2 and 3, so as to partially extend the plug 80. The plug may now be grasped and the user pulls the cord out of the casing to any extent desired. The drum at this time is rotating clockwise in Figure 3, against the restraint of spring 52.

When the cord has been extended to the desired extent, the user latches the drum against rotational movement in either direction, by means of the detent assembly 35. It will be understood, in this regard, that while the cord was being extended and the drum was being turned clockwise in Figure 3, the user would have been holding the stem 34 depressed, that is, shifted to the left in Figure 4, to disengage the cross arm 38 from disc 46. Only after the cord is extended to the desired length is the head 36 released, and spring 42 will now expand to automatically engage cross arm 38 in any notches 45 with which it may happen to be in registration at this particular moment.

In any event, when this has been done, the user is enabled to employ the electrical appliance. Assuming that the appliance is no longer to be used, the cord is disengaged therefrom, and one merely depresses head or button 36. The drum is thus unlatched, and automatically rotates counterclockwise in Figure 3 under the force of the spring 52, to wind cord 76 and retract plug 80 into the recess 82.

In any position to which the drum is rotated, there is of course a full electrical connection between the leads of the appliance cord and the respective terminals of the receptacle R engaged by prongs 72.

It will be seen that the device has general utility as a cord retraction and cord-carrying means for any of a large variety of electrical appliances. In this connection, no modification of the conventional electrical receptacle R is required, and still further, no modification of any electrical appliance with which the device is associated is needed. Still further, the cord is at all times ready for use, and can be, in fact, used for a number of different appliances, at different times. Still further, the device can be moved to any location desired, wherever there is a receptacle.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

An appliance cord reel comprising a flat hollow casing having first and second end walls and a sidewall, an insulated drum journalled on and positioned between said end walls, said drum having a hub and spaced flanges on the hub having peripheral edges, circumferential contact strips secured to and extending around said peripheral edges, spring-biased brushes on the casing sidewall severally engaged with the contact strips, current outlet engaging means severally connected to the brushes, an appliance cord wound on the drum core between the drum flanges and having a first end secured to the drum, and wires at said first end severally connected to the strips, said cord having a second end, and opening means in the casing sidewall through which the second end of the cord emerges, said second end of the cord having an electrical connector thereon larger in cross-section than the cord, said opening means comprising a bore in the casing sidewall having an inner end, said connector being within said bore in the spring-retracted position of the cord, said sidewall having a closed slot opening to said bore, a slide working in said slot having an eye through which the cord extends freely, said eye being behind said connector, and normally engaged with the inner end of the bore, and an operating button fixed to said slide and exposed externally of the casing for moving the connector out of said bore.

References Cited in the file of this patent

UNITED STATES PATENTS

| | | |
|---|---|---|
| 434,917 | Chassagne | Aug. 26, 1890 |
| 914,772 | Williamson | Mar. 9, 1909 |
| 1,027,634 | Williamson | May 28, 1912 |
| 1,364,805 | Redmon | Jan. 4, 1921 |
| 1,697,033 | Umscheid | Jan. 1, 1929 |
| 1,975,419 | Grube | Oct. 2, 1934 |
| 2,498,609 | Reil | Feb. 21, 1950 |

FOREIGN PATENTS

| | | |
|---|---|---|
| 1,057,821 | France | Nov. 4, 1953 |
| 603,390 | Germany | Sept. 29, 1934 |
| 76,727 | Netherlands | Dec. 15, 1954 |
| 84,148 | Switzerland | Feb. 16, 1920 |